US005988251A

United States Patent [19]

Hunt et al.

[11] Patent Number: 5,988,251

[45] Date of Patent: Nov. 23, 1999

[54] LABEL APPLYING APPARATUS

[75] Inventors: Anthony Raymond Hunt, Middlewich; Steven John Diggle, Bury; Craig Swinburn, Manchester, all of United Kingdom

[73] Assignee: Markem Technologies Limited, Nottingham, United Kingdom

[21] Appl. No.: 08/945,866

[22] PCT Filed: Mar. 4, 1997

[86] PCT No.: PCT/GB97/00593

§ 371 Date: Apr. 14, 1998

§ 102(e) Date: Apr. 14, 1998

[87] PCT Pub. No.: WO97/32785

PCT Pub. Date: Sep. 12, 1997

[30] Foreign Application Priority Data

Mar. 4, 1996 [GB] United Kingdom .................... 9604568

[51] Int. Cl.$^{6}$ .............................. B32B 31/00; B44C 31/00

[52] U.S. Cl. ........................... 156/539; 156/541; 156/542

[58] Field of Search .................................... 156/542, 541, 156/539, 350, 384, 556, 362, 357

[56] References Cited

U.S. PATENT DOCUMENTS

| | | | |
|---|---|---|---|
| 3,238,080 | 3/1966 | Schluter | 156/351 |
| 4,321,103 | 3/1982 | Lindstrom et al. | 156/351 |
| 5,421,948 | 6/1995 | Crankshaw et al. | 156/486 |
| 5,540,795 | 7/1996 | Franklin et al. | 156/64 |

FOREIGN PATENT DOCUMENTS

| | | |
|---|---|---|
| 35 25 599 A1 | 1/1987 | Germany . |
| 1000055 | 4/1995 | Netherlands . |
| WO 90/08081 | 7/1990 | WIPO . |

*Primary Examiner*—Curtis Mayes
*Assistant Examiner*—J. A. Lorengo
*Attorney, Agent, or Firm*—Fish & Richardson P.C.

[57] ABSTRACT

A label applicator for applying labels to each of two mutually perpendicular surfaces of a box that is advanced past the applicator. A displaceable arm defines a label support station adjacent its free end and conveyor belts are provided for delivering labels to the support stations. The arm is selectively positioned in either a first position in which a label located at the support station is contacted by and thereby transferred to a leading surface of an advancing box or a second position in which a label located at the support station is contacted by and thereby transferred to a side surface of an advancing box. Displacements of the arm are controlled independent upon the passage of the box past the applicator and labels transferred from the support station are replaced as they are applied to a box.

16 Claims, 7 Drawing Sheets

LABEL APPLYING APPARATUS

This is a continuation of International Patent Application No. PCT/GB97/00593, with an International Filing Date of Mar. 4, 1997, now pending.

DESCRIPTION OF INVENTION

This invention relates to a label applying apparatus.

It is highly desirable to be able to identify an article such as a packaged article e.g. a box by applying labels to each of two different sides of the box. If a box is labelled on only one side, the label may be covered where a stack of boxes are supported on for example a pallet. This means that someone looking for a particular product will not be able immediately to identify the content of the box and will have to turn the boxes in order to have sight of the label.

Proposals have been advanced in the past for producing a single label which can be wrapped around the corner of a box so that one part of the label is visible on one part of the box and the other part of the label is visible on the adjacent side of the box. This approach works but is wasteful of label material and furthermore means that the label is located at a relatively vulnerable part of the box. It is preferable to provide separate labels on mutually perpendicular surfaces of a box and accordingly this has been achieved in the past by providing two label applicators one of which is dedicated to applying labels to the leading surface of a box which is being advanced along a conveyor and the other of which is dedicated to applying labels to a side wall of the box. This approach overcomes the problems associated with "wrap-around" label systems but at the expense of requiring two independent label applicators and the space adjacent a conveyor necessary to accommodate those two independent applicators. It is an object of the present invention to obviate or mitigate the problems outlined above.

According to a first aspect of the invention we provide a label applying apparatus for applying labels to each of two transverse surfaces of an article as the article moves relative to the apparatus, the apparatus comprising a movable member providing a label support station, means for delivering labels to the label support station, means, for selectively positioning the member in a first position in which a label located at the label support station is applied to a first surface of the article and for positioning the member in a second position in which a label located at the label support station is applied to a second surface of the article.

Thus by moving the movable member between its first and second positions and delivering a label to the label support station, labels may be applied conveniently to each of the two transverse surfaces of the article. The two transverse surfaces of the article will usually be generally perpendicular but need not be, depending on apparatus design.

In one embodiment the movable member comprises an arm which is pivotal relative a fixed arm between the first and second positions. The fixed arm may provide a label holding station from which labels are conveyed for delivery to the label support station of the relatively pivotal arm. Alternatively the movable member may comprise an arm having a pair of rigidly connected elements, one of the elements providing the label support station and the other of the elements providing a label holding station from which labels are conveyed for delivery to the label support station.

In each case, the means for delivering labels to the label support station may comprise a conveyor means having one or more belts although other conveying arrangements may be utilised if desired. If required, the conveyor means may include means for establishing a reduced pressure to retain the labels in contact with the conveyor belts as the labels are delivered to and retained at the label support station.

To facilitate application of the labels to the surfaces of the article, the label support station may comprise a convex surface and thus a label may be applied to the article as relative rolling type movement occurs between the convex surface of the label support station and the surface of the article. Thus the labels may be applied by means of pressure as the surfaces of the article to which the labels are to be applied contact a label on the movable member of the apparatus which may occur as the article moves relative to the label applying apparatus.

In one arrangement, spring biasing means are provided to spring bias the movable member towards the surface of the article to which the label is to be applied and the member may be moved against the force of the spring biasing means as the label contacts the surface of the article to which it is to be applied.

Conveniently means are provided to sense movement of the member as the member is moved against the force of the spring biasing means as the label contacts the surface of the article to which the label is to be applied. Such a sensing means may provide an input to a control means which may thus coordinate movement of the movable member and delivery of the labels to the label support means, with the relative movement of the article to which labels are to be applied.

According to a second aspect of the invention we provide a method of applying labels to each of two transverse surfaces of an article as the article moves relative to the apparatus using an apparatus according to any one of the preceding claims comprising the steps of delivering a first label to the label support station, positioning the movable member in a first position relative to the article, applying the label to a first surface of the article, positioning the movable member in a second position, delivering a second label to the label support station, applying the second label to the second surface of the article.

Embodiments of the present invention will now be described, by way of example, with reference to the accompanying drawings, in which;

FIGS. 1A to 1E schematically illustrate an apparatus in accordance with the invention at various sequential positions in a label application cycle in which labels are applied to two mutually perpendicular sides of a box advancing on a conveyor;

FIGS. 2A to 2C illustrate a modification to a component of the apparatus of FIGS. 1A to 1E;

FIG. 3 schematically represents the spring loading of components of the apparatus shown in FIGS. 1A to 1E and 2A to 2C;

FIGS. 4A to 4E schematically illustrate a second embodiment of an apparatus in accordance with the invention at various sequential positions in a label application cycle in which labels are applied to two mutually perpendicular sides of a box advanced on a conveyor;

Figure 1A:
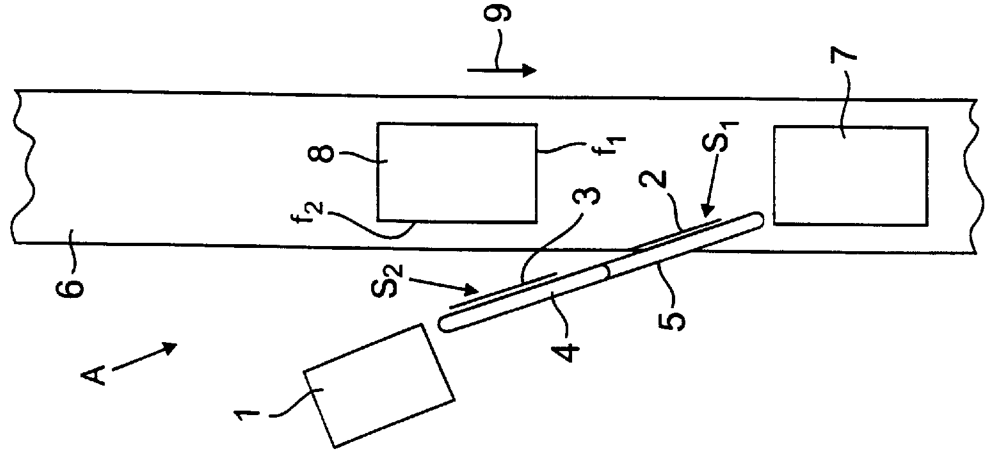
FIG. 1 illustrates the operation of a first embodiment of the present invention, the sequential displacement of components of the device being shown in FIGS. 1A to 1E.

Referring first to FIG. 1A there is shown a label applying apparatus A in a condition prior to the initiation of a label applying cycle. The apparatus A includes a label printing means 1 which, for each label applying cycle, produces two identical self adhesive labels 2, 3, although in another arrangement, the labels need not be identical. The first of these labels, label 2, is delivered by a conveyor mechanism which is not shown, to a label support station S1 which is provided at one side of a moveable member comprising pivoted arm 5 which is pivotally supported on a fixed arm 4 of the apparatus A. A second label 3, is shown located and held at a label holding station S2 provided at one side of the fixed arm 4.

In the position shown in FIG. 1A, at least part of the pivoted arm 5 extends over one side of a conveyor 6 which is operable to convey a plurality of articles, comprising in this example, packaged items e.g. boxes 7, 8 therealong. As illustrated, a box 7 has already been labelled with labels having been applied to two surfaces of the box 7 as hereinafter described, and a subsequent box 8 is about to be labelled. The conveyor 6 moves the boxes 7, 8 in the direction of the arrow 9.

Figure 1B:
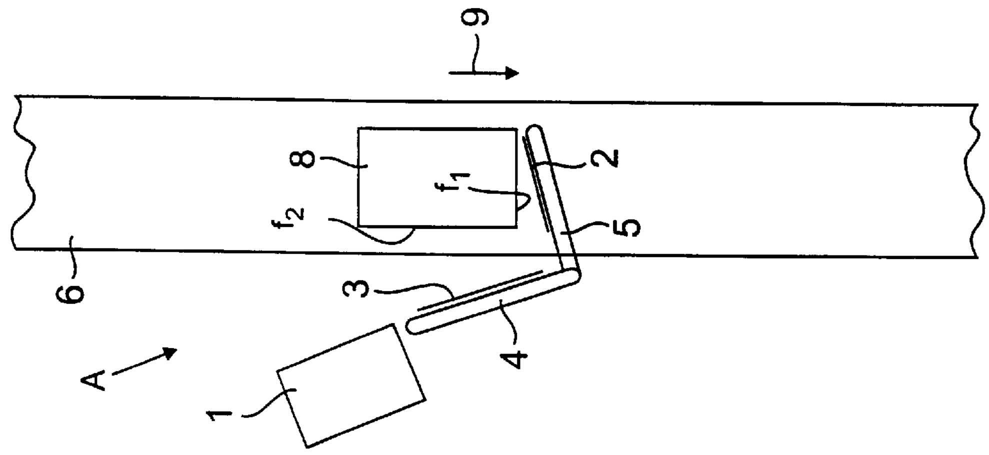
Figure 1C:
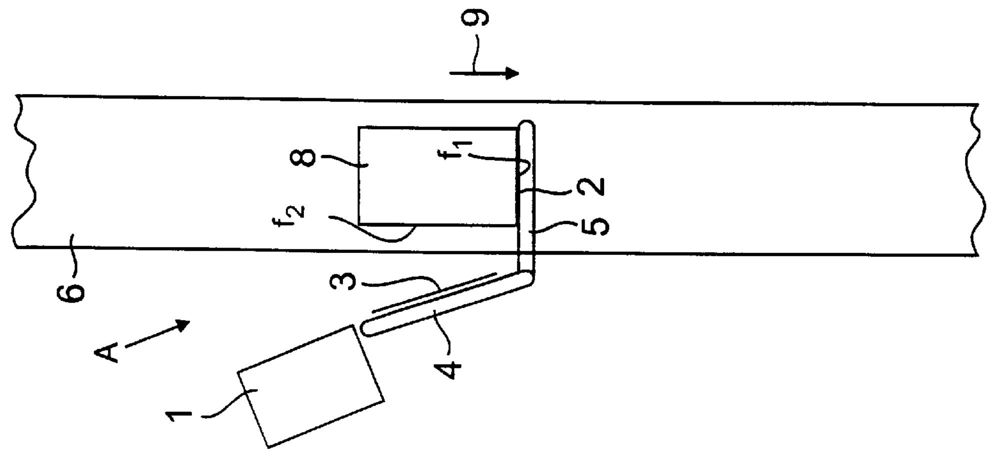

Referring now to FIG. 1B, the label applying apparatus A is shown in a condition in which the pivoted arm 5 has been moved relative to the fixed arm 4 in front of and thus into the path of the oncoming box 8, after the already labelled box 7 has been moved clear of the label applicator apparatus A.

In this example, the pivoted arm 5 is spring biased to the position shown in FIG. 1B. As the box 8 continues to advance, a first surface, namely the front face f1, of the box 8 will come into contact with the label 2 on the pivoted arm 5 and push the pivoted arm 5 backwards against the spring biasing means. As the pivoted arm 5 is pushed back, the label 2, which is sticky side outermost, is pressed against the front face f1 of the box 8 and thus is applied thereto.

Figure 1E:
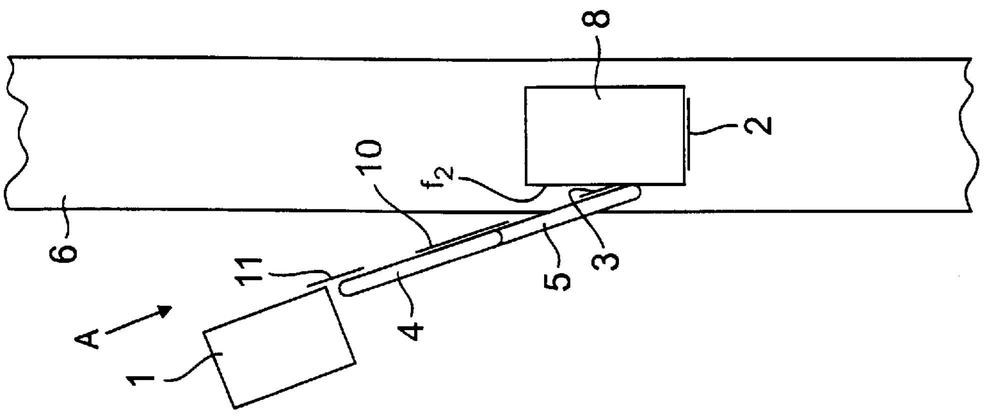
Figure 1D:
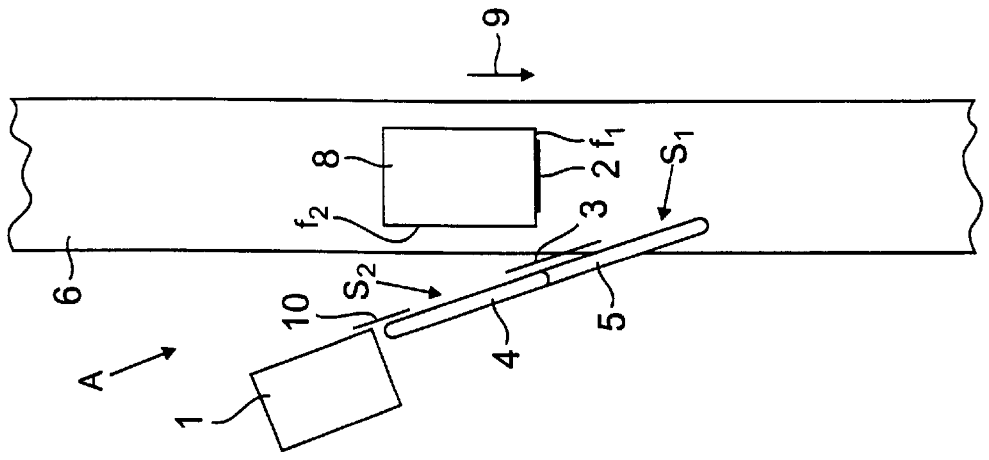

Once the pivoted arm 5 has been pushed back sufficiently far, a sensing means (not shown) provides a signal to control means (not shown) which issues a signal to an appropriate actuating means (not shown) to draw the pivoted arm 5 back to the position shown in FIG. 1D against the force of the spring biasing means, to a position in which the pivoted arm 5 is generally aligned with the fixed arm 4. When in this aligned position, the second label 3 may be conveyed from the label holding station S2 to the label support station S1 by the conveyor means, and at the same time or subsequently, a further label 10 may be printed or at least partially printed by the printing means 1.

As the box 8 continues to be advanced along the conveyor means 6 the second label 3 at the label support station S1 will come into contact with a second surface, namely in this example side face f2 of the advancing box 8 as illustrated in FIG. 1E and thus the second label 3 will be applied to the side face f2 of the advancing box 8. The pivoted arm 5 may be pushed back against the spring biasing means slightly out of alignment with the fixed arm 4 as the box 8 is advanced which will assist in applying the second label 3 to the side face f2 of the box 8.

Simultaneously with applying of the second label 3 to the side face f2 of the box 8 or subsequently, a yet further label 11 may be printed, whilst the previously printed label 10 is conveyed along the fixed arm 4 away from the printing means 1. As the box 8 continues to advance it will eventually be in the position in which the box 7 is illustrated in FIG. 1A.

It will be noted that as the labels 2, 3, 10, 11 etc. are advanced from the label holding station S2 to the label support station S1, the pivoted arm 5 is aligned with the fixed arm 4 and therefore no label needs to move around a bend or the like as it is conveyed.

Figure 2A:
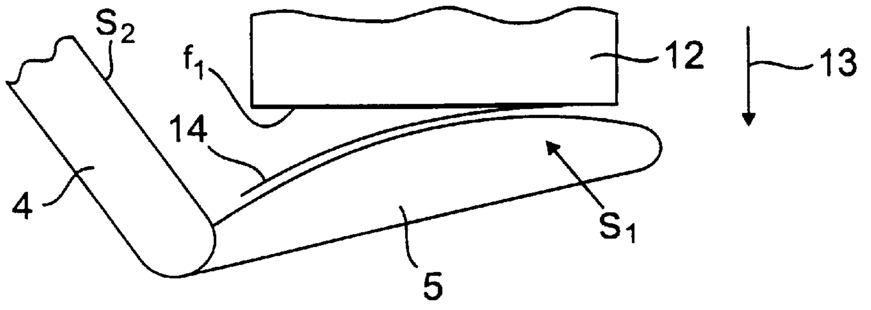
Figure 2B:
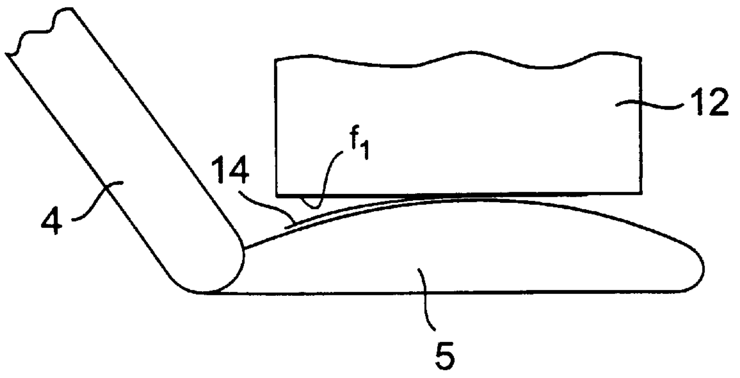
Figure 2C:
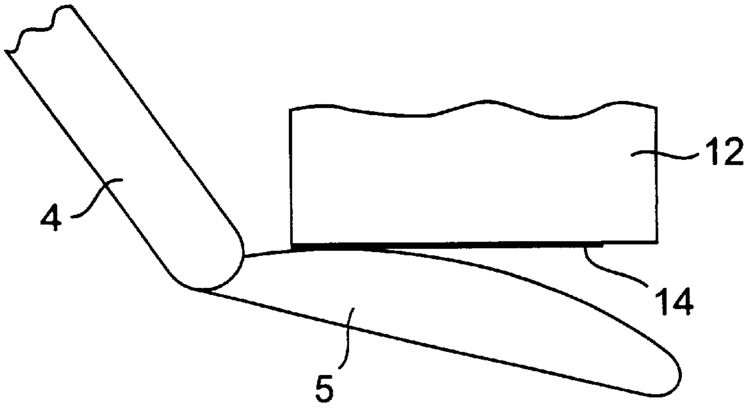

FIG. 2 shows a modification to the embodiment of FIG. 1 in which the label support station S1 has a convex surface upon which labels are supported. A box 12 is shown advancing in the direction of arrow 13, and as the front face f1 of the box 12 comes into contact with a label 14 supported on the convex surface of the pivoted arm 5, the movement of the box 12 pushing against the spring biased pivoted arm 5 has the effect of applying label 14 to the front face f1 of the box 12 by a type of rolling action. FIGS. 2A to 2C show this rolling action at various stages of the process.

Again a sensor means may be provided to detect when pivoted arm 5 has been pushed back by the advancing box 12 beyond a set position, such as the position indicated in FIG. 2C.

The advantage of the arrangement shown in FIG. 2 over that shown in FIG. 1 is that the contact pressure between the box 12 and the label 14 is increased as the force applied by the advancing box 12 is concentrated on a relatively limited area as a result of the convex shape of the support surface of the pivoted arm 5 although conveying the label 14 from the label holding station of the fixed arm 4 to the pivoted arm 5, even when the two arms 4 and 5 are aligned, may be more complicated.

Figure 3:
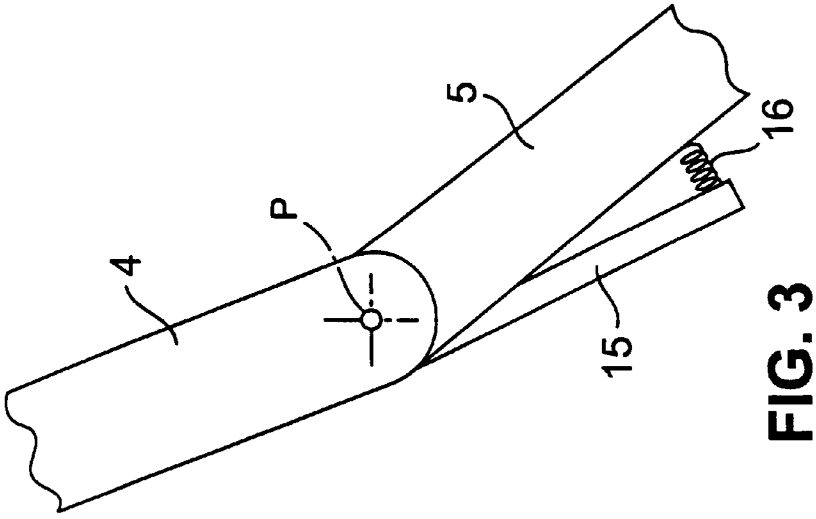

Referring to FIG. 3, a spring loading mechanism is shown to bias pivoted arm 5 out of alignment with the fixed arm 4 towards the position indicated in FIG. 1B. The mechanism includes a lever 15 with there being an actuator (not shown), such as an electrically operated and/or pneumatic actuator between the fixed arm 4 and the lever 15, which actuator when operated, causes pivotal movement of the pivoted arm 5 about axis P relative to the fixed arm 4. A spring 16 is located between the lever 15 and the pivoted arms such that the arm 5 is biased away from the lever 15. The pivoted arm 5 is thus able to pivot to a limited extent about axis P relative to the lever 15.

Of course when the pivoted arm 5 is not in contact with any surface of any box, the pivoted arm 5 may move away from the lever 15 under the influence of the spring 16 to the position shown in FIG. 3. When the pivoted arm 5 is contacted by a surface of a box, it is pushed back against the biasing force of the spring 16. Of course any alternative spring or other resilient biasing means may be provided.

Referring to FIG. 4 a second embodiment of the present invention is shown. In this embodiment, each of the label support station S1 and label holding station S2 are provided on a single movable member M pivoted as a whole about an axis P1 and comprising a pair of mutually inclined arms 21,22 with no pivoting occurring between them.

Figure 4B:
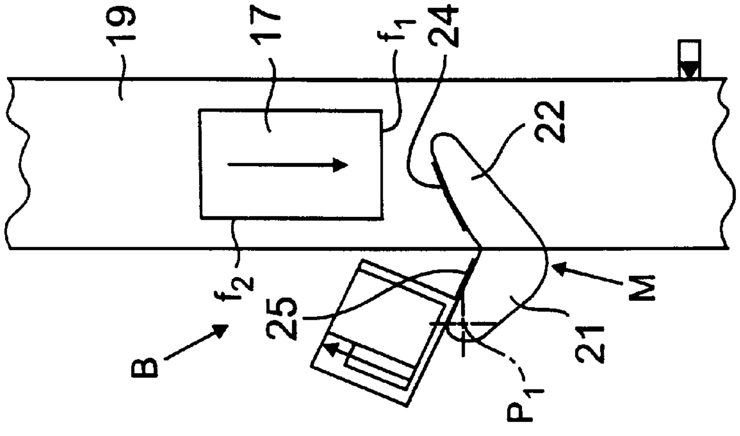
Figure 4A:
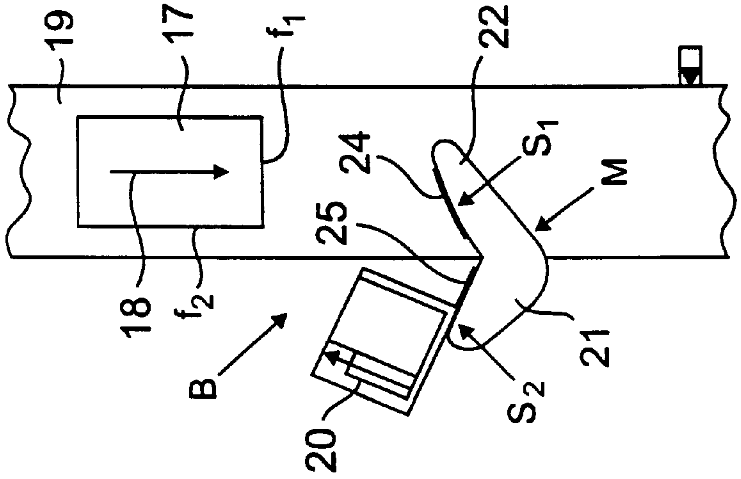

In FIG. 4A, there is shown a box 17 which is being advanced in the direction of arrow 18 on a conveyor 19 towards a label applicator apparatus B. Again the label applying apparatus B includes a printing means 20 for printing labels immediately to their being applied. Labels issuing from the printing means 20, are fed onto one of the arms of the movable member M, namely arm 21 which provides the label holding station S2, and prior to application the labels are delivered to the label support station S1 on the other arm 22 of the movable member M. The label support station S1 has a slightly convex surface as with the arm 5 in the FIG. 2 embodiment.

A label applying cycle is as follows.

Figure 4C:
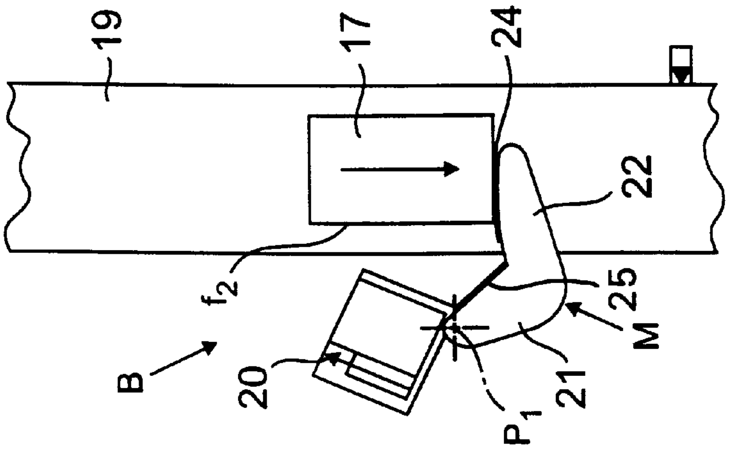
Figure 4D:
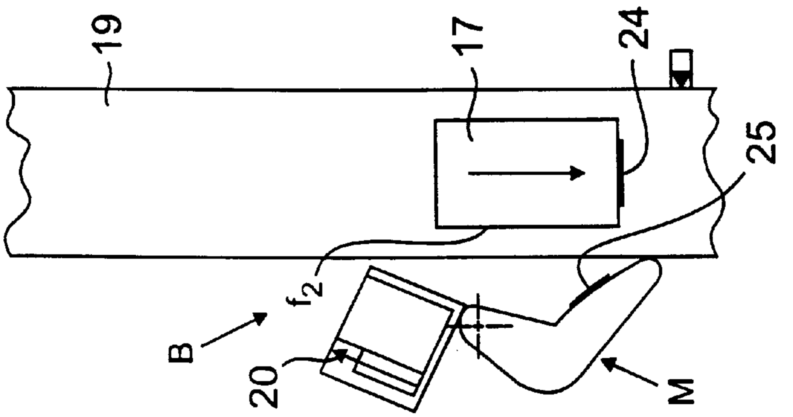

A first label 24 is advanced along the arm 21 from the label holding station S2 to the arm 22 and is delivered to the label support station S1. At the same time or subsequently a second label 25 may be advanced from the printing means 20 to the label holding station S2, as indicated in FIG. 4B. As the box 17 onto which labels 24,25 are to be applied advances, a first surface being a front face f1 of the box 17 comes into contact with the label 24 at the label support station S1, as shown in FIG. 4C, and pushes the arm 22 back, to move the movable member M about a pivot axis P1 causing the convex surface of the arm 22 upon which the label 24 is supported to roll the label 24 onto the advancing front face f1 of the box 17. Thus the label 24 is applied to the front face F1 of the box 17.

Once the member M has been thus pivoted about its axis P1 a predetermined amount as sensed by a sensing means, an actuator is operated by a control means to move the arm 22 out of the path of the oncoming box 17, and at the same time or subsequently, the label 25 at the label holding station S2 is advanced along the arm 21 to the label support station S1. At the same time or subsequently, a further label 26 may be printed or partially printed and moved along arm 21 by a conveying means, towards the label holding station S2.

Figure 4E:
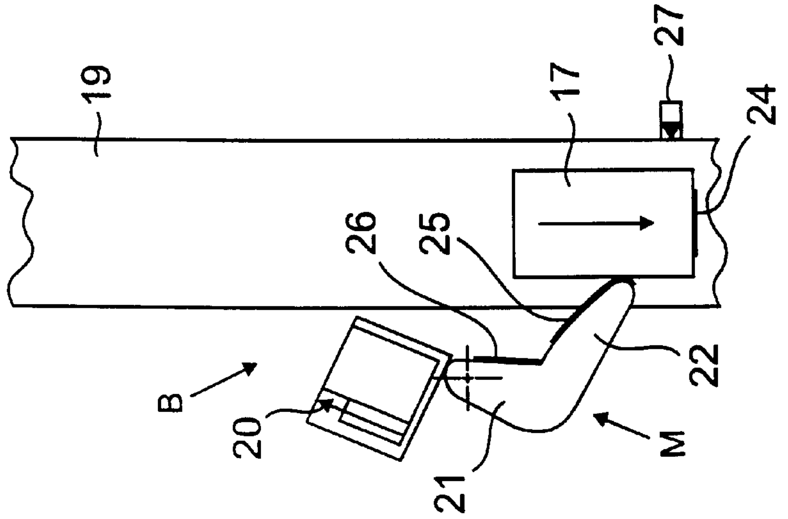

Once the front face f1, or leading edge of the box 17 reaches a position on the conveyor 19 adjacent a sensor 27, the control means operates the actuator to move the movable member M back about pivot axis P1 to move the arm 22 inwards to the position shown in FIG. 4E when the second label 25 may be applied to a second surface e.g. side face f2 of the box 17 by the label 25 being conveyed from the free end of the arm 22. At the same time, the next label 26 at the label holding station S2 may be conveyed to the label support station S1 ready for application to the front face of the next oncoming box.

Once the entire box 17 has moved beyond the sensor 27, the movable member M may be pivoted again to the position shown in FIG. 4A with the label 26 directly in the path of the oncoming next box (not shown). The label applying cycle for the box 17 is then complete.

Figure 5:
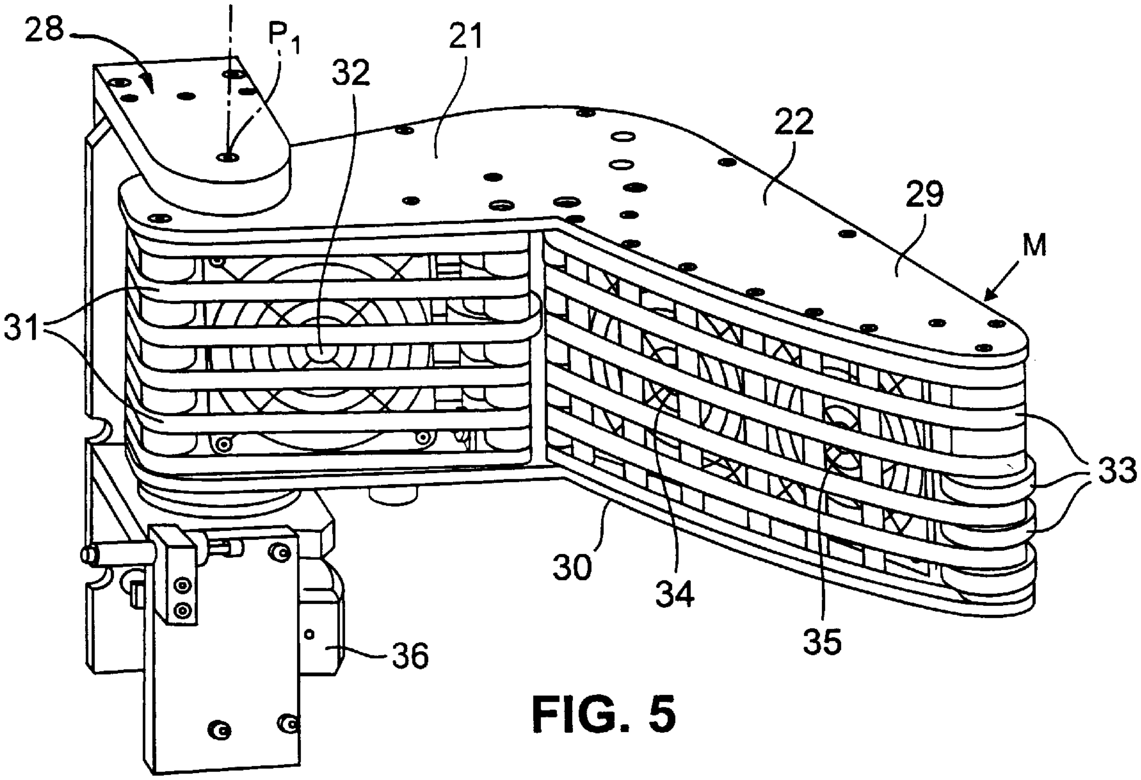
FIG. 5 is a perspective front view of components of the embodiment of FIGS. 4A to 4E.
Figure 6:
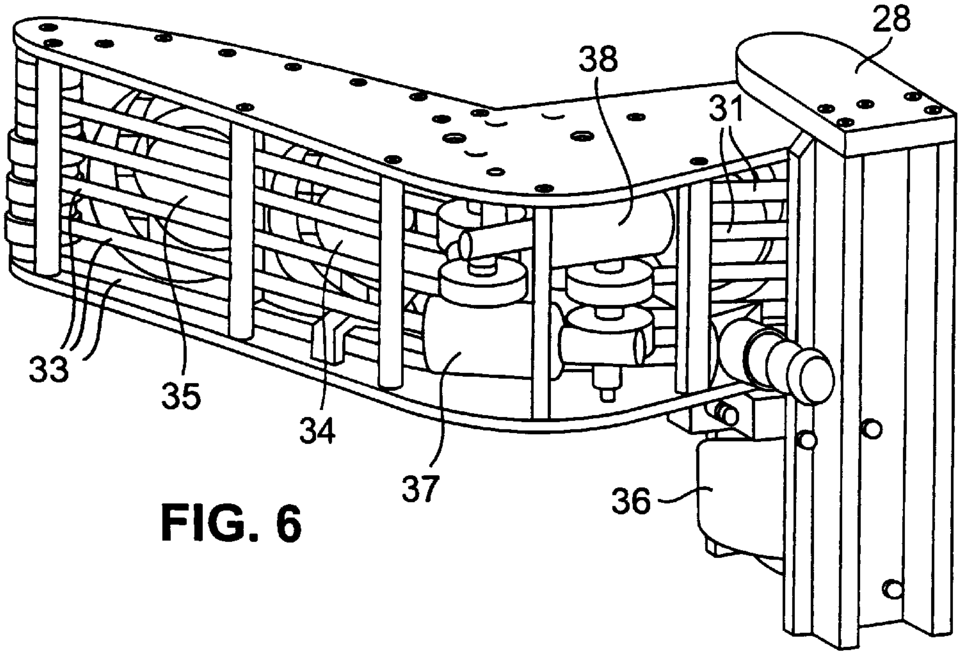
FIG. 6 is a rear view of the component of FIG. 5.
Figure 7:
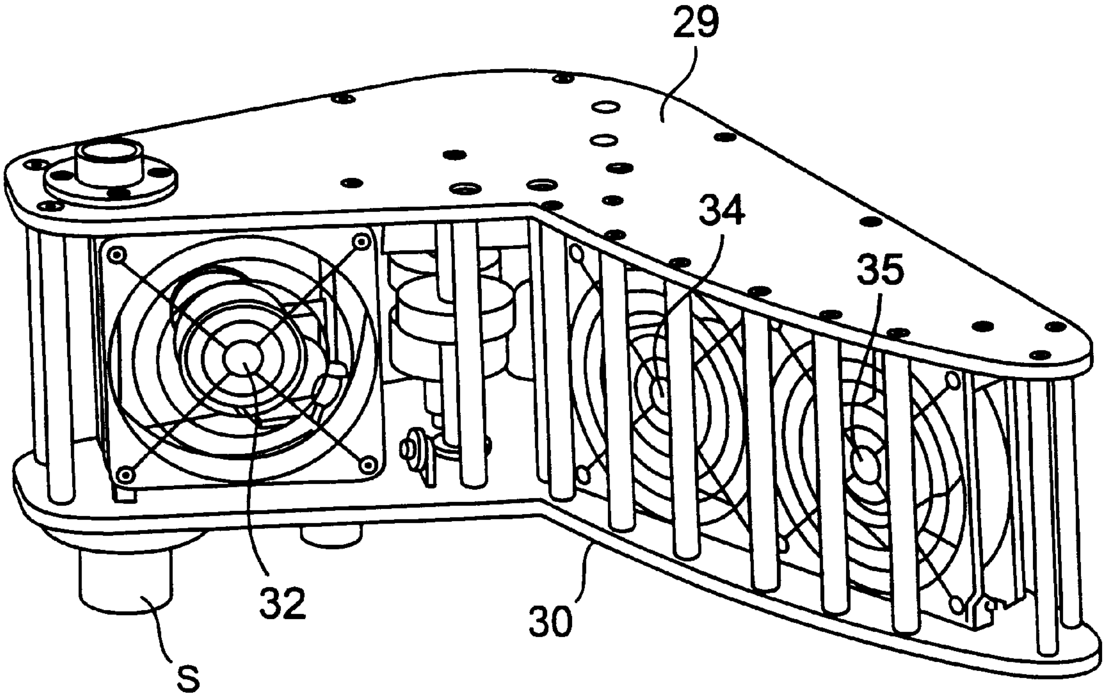
FIG. 7 is a view similar to that of FIG. 5 but showing the structure without components used to transport labels.

FIGS. 5, 6 and 7 illustrate the detailed construction of the movable member M of the FIG. 4 embodiment. In each of the figures, no labels are shown, and in FIG. 7 conveyor belts have been removed for clarity.

The member M is pivotally supported by a bracket 28 and comprises an upper plate 29 and a lower plate 30 interconnected by a series of pillars, roller shafts and drive shafts. A first series of six resilient belts 31 is arranged to extend along the surface of an inner portion of arm 21 the member M, those belts defining a label holding station in front of a fan 32. A second series of six belts 33 extends across the surface of an inner portion of the arm 22 those belts defining a label support station in front of a pair of fans 34, 35. The fans 32, 34 and 35 are provided to hold labels (not shown) on the belts 31,33.

The angular position of the movable member M relative to the bracket 28 is controlled by, in this example, a pneumatic actuator 36, an output shaft of which is connected to a shaft S extending downwards from the plate 30. A geared motor 38 drives the belts 31 and a geared motor 37 drives the belts 33. Thus it will be noted that the belts 31 and 33 can be advanced independently and as indicated in FIG. 4 the labels may be advanced to the very end of the arm 22 so as to be readily applied to the side surfaces f2 of the boxes. The belts 33 can then be slowly advanced or allowed to “freewheel” as a label is pulled off the movable member M onto a box. As a separate operation, the label 26 can then be advanced from the label holding station S2 as shown in FIG. 4E to the position shown for the label 24 in FIG. 4D ready for the initiation of the next label application cycle.

It will be appreciated that labels can be dispensed to the apparatus A/B from a pre-printed roll of labels or may be printed as required, by a printing means 1,20 located adjacent the apparatus as described above.

It will be appreciated that in each of the embodiments described, movement of the pivoted arm 5 or whole member M, must he accomplished very quickly in relation to the speed of the advancing boxes on the conveyors. Thus any suitable kind of actuating means for achieving such movements may be utilised and the operation of such actuating means may be accomplished by a computer operated control means which may receive additional inputs to those described, from sensors of the label applicator apparatus A,B which determine the positions of the relevant boxes or other articles along the conveyor. The operation of the printing means 1,20 where provided, may be under the control of the control means so that a label with specific information to an article may be at least partially printed before a previous label has been applied to an article. Various modifications may be made without departing from the scope of the invention.

For example, although in FIGS. 5 and 7 a conveying means is described which comprises a plurality of conveyor belts 31,33, an alternative conveyor means may be provided as required. Instead of a pneumatic actuator 36 to cause movement of the movable member M (and/or the pivotal arm 5 in the first embodiment), an alternative actuator such as an electrically operated actuator may be utilised.

As described, the articles to which labels are applied have two mutually generally perpendicular surfaces f1 and f2 but in another embodiment the two surfaces f1,f2 to which labels are applied need not be perpendicular to one another, although some modification to the apparatus described may be required to enable labels to be applied to both faces.

In the example described, relative movement between the articles and the label applying apparatus is achieved by conveying the articles along a conveyor. In another arrangement such relative movement may otherwise be achieved, for example by moving the apparatus A,B in addition to or instead of the articles to which labels are to be applied.

The moveable member M of the FIGS. 4 to 7 embodiment may or may not be spring or otherwise resiliently biased to the position shown in FIG. 4A in which the one arm 22 is directly in the path of an oncoming article.

The features disclosed in the foregoing description, or the following claims, or the accompanying drawings, expressed in their specific forms or in terms of a means for performing the disclosed function, or a method or process for attaining the disclosed result, as appropriate, may, separately or in any combination of such features, be utilised for realising the invention in diverse forms thereof.

We claim:

1. A label applying apparatus for applying first and second labels to each of two transverse surfaces of an article as the article moves relative to the apparatus, the apparatus comprising a movable applicator member which is selectively positionable in first and second positions where the first and second labels respectively are applied and which provides a label support station for the first label, the applicator member further comprising a label holding station arranged to hold a second label, and a transfer apparatus to deliver labels from the label holding station to the label support station, whereby when the movable applicator member is moved to the first position the first label located at the label support station is applied to a first surface of the article and when the movable applicator member is moved from the first position to the second position, and the second label is conveyed from the label holding station to the label support station, the second label is applied to a second surface of the article.

2. An apparatus according to claim 1 wherein the movable applicator member comprises an arm which is pivotal relative to a fixed arm between the first and second positions, the fixed arm providing the label holding station from which labels are conveyed for delivery to the label station of the relatively pivotal arm.

3. An apparatus according to claim 1 wherein the movable member comprises a pair of rigidly connected or integral arm elements, one of the arm elements providing the label support station and the other of the arm elements providing the label holding station from which labels are conveyed for delivery to the label support station.

4. An apparatus according to claim 1 wherein the means for delivering labels to the label support station comprises a conveyor means having one or more belts.

5. An apparatus according to claim 4 wherein the conveyor means includes means for establishing a reduced pressure to retain the labels in contact with the conveyor belts as the labels are delivered to and retained at the label support station.

6. An apparatus according to claim 1 wherein the label support station comprises a convex surface and a label is applied to the article as relative rolling type movement occurs between the convex surface of the label support station and the surface of the article.

7. An apparatus according to claim 1 wherein the label is applied by means of pressure as the surface of the article to which the label is to be applied contacts the label on the movable arm of the apparatus.

8. An apparatus according to claim 7 wherein spring biasing means are provided to spring bias the movable arm towards the surface of the article to which the label is to be applied and is moved against the force of the spring biasing means as the label contacts the surface of the article to which it is to be applied.

9. An apparatus according to claim 8 wherein means are provided to sense movement of the arm as the arm is moved against the force of the spring biasing means as the label contacts the surface of the article to which the label is to be applied.

10. An apparatus according to claim 1 which comprises a control means to coordinate movement of the movable member, delivery of the labels to the label support means with the relative movement of the article to which labels are to be applied.

11. A method of applying labels to each of two transverse surfaces of an article as the article moves relative to the apparatus using an apparatus comprising a movable applicator member which is selectively positionable in first and second positions where the first and second labels respectively are applied, the movable member providing a label support station for the first label and the movable member further comprising a label holding station arranged to hold a second label and a label transfer device to deliver labels from the label holding station to the label support station, the method comprising the steps of delivering a first label to the label support station, positioning the applicator member in a first position relative to the article, applying the label to a first surface of the article, positioning the applicator member in a second position, delivering a second label to the label support station from the label holding station, applying the second label to the second surface of the article.

12. A method of applying a label to an article, comprising:

providing a label applying apparatus capable of applying labels to transverse surfaces of an article, the apparatus including a pivoting label applicator arranged such that the applicator can be positioned to apply a label to a first surface and a second, transverse surface solely by pivoting motion, pivoting the label applicator to a first position for applying a first label to the first surface, and pivoting the label applicator to a second position for applying a second label to the second, transverse surface.

13. The method of claim 12 wherein the label applicator includes two leg portions defining a fixed angled shape and a pivot point adjacent a free end of one of said leg portions.

14. The method of claim 12 wherein the label applicator includes two leg portions articulated at a pivot.

15. The method of claim 13 or 14 wherein the applicator includes a curved surface that applies at least one of said first or second labels in a rolling motion.

16. The method of claim 15 wherein said first leg portion includes a label support portion that applies the label to a surface and the second leg portion includes a label holding station that holds a label for subsequent application.

* * * * *